United States Patent
Tayebati

(10) Patent No.: US 6,678,444 B2
(45) Date of Patent: Jan. 13, 2004

(54) LOW POWER FIBEROPTIC RELAY FOR RADIO COMMUNICATIONS

(75) Inventor: Parviz Tayebati, Boston, MA (US)

(73) Assignee: CoreTek, Inc., Wilmington, MA (US)

(*) Notice: Subject to any disclaimer, the term of this patent is extended or adjusted under 35 U.S.C. 154(b) by 14 days.

(21) Appl. No.: 09/761,011

(22) Filed: Jan. 15, 2001

(65) Prior Publication Data

US 2002/0094160 A1 Jul. 18, 2002

(51) Int. Cl.$^7$ .................................................. G02F 1/01
(52) U.S. Cl. ......................................... 385/31; 385/4
(58) Field of Search ............................... 385/4, 31, 18, 385/129, 131, 132

(56) References Cited

U.S. PATENT DOCUMENTS

| | | | | |
|---|---|---|---|---|
| 4,790,635 A | * | 12/1988 | Apsley | 359/260 |
| 4,872,744 A | * | 10/1989 | Abeles et al. | 257/189 |
| 4,900,134 A | * | 2/1990 | Inoue et al. | 359/241 |
| 5,027,178 A | * | 6/1991 | Svilans | 257/14 |
| 5,237,639 A | * | 8/1993 | Kato et al. | 372/43 |
| 5,757,832 A | * | 5/1998 | Uchida | 372/106 |
| 5,889,805 A | * | 3/1999 | Botez et al. | 372/45 |

* cited by examiner

Primary Examiner—Frank G. Font
Assistant Examiner—Kevin Kianni
(74) Attorney, Agent, or Firm—Pandiscio & Pandiscio, P.C.

(57) ABSTRACT

A low power fiberoptic relay for radio communications. In one form of the invention, a laser is located at one end (i.e., the communication network end) of the relay and a modulator is located at the other end (i.e., the receiver end) of the relay.

1 Claim, 6 Drawing Sheets

LOW POWER FIBEROPTIC RELAY FOR RADIO COMMUNICATIONS

FIELD OF THE INVENTION

This invention relates to radio communications in general, and more particularly to ground-based relays for such communications.

BACKGROUND OF THE INVENTION

Radio communications provide the ability to transmit voice and/or data between two remote locations (or "stations"). These stations may be stationary or mobile. The stationary station(s) may be "freestanding", or they may be tied into a larger communications network via a ground-based relay.

By way of example, in FIG. 1 there is shown one such communications system, e.g., a cellular telephone system. More particularly, there is shown a mobile station 5 (e.g., an automobile) having a radio frequency (RF) transmitter 10 (e.g., a cellular telephone), and a stationary station 15 (e.g., a "cell tower") having a RF receiver 20 (e.g., a cellular telephone receiver). Stationary station 15 is itself tied into a larger communications network 25 (e.g., the telephone system) by way of a ground-based relay 30.

In some circumstances, stationary station 15 may be located in a readily accessible area, e.g., the top of a building. In other situations, stationary station 15 may be situated in a relatively remote and/or hostile environment, e.g., at the top of a mountain, etc. These locations can make it difficult to provide abundant power to stationary station 15, RF receiver 20 and relay 30. In this respect it should be appreciated that, depending on the nature of its operation, relay 30 frequently requires substantial amounts of power to operate. This can present serious challenges to system designers.

SUMMARY OF THE INVENTION

As a result, one object of the present invention is to provide an improved low power relay which minimizes the power required to relay radio communications between an RF receiver and a larger communications network.

And another object of the present invention is to provide an improved relay which can also be used to supply power from a larger communications network to an RF receiver, the relay, etc.

These and other objects of the present invention are addressed by the present invention which, in one preferred embodiment, comprises a light modulator comprising a first mirror comprising a quarter-wave mirror stack comprising high reflectivity p+ type InP/InGaAsP layers; a Franz-Keldysh layer adjacent the first mirror, the Franz-Keldysh layer comprising i-InGaAsP; a second mirror adjacent the Franz-Keldysh layer, the second mirror comprising a quarter-wave mirror stack comprising low reflectivity n+ top, p+ type InP/InGaAsP layers; and a base layer adjacent the second mirror, the base layer comprising n+ type InP material.

BRIEF DESCRIPTION OF THE DRAWINGS

These and other objects and features of the present invention will be more fully disclosed in the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 1:
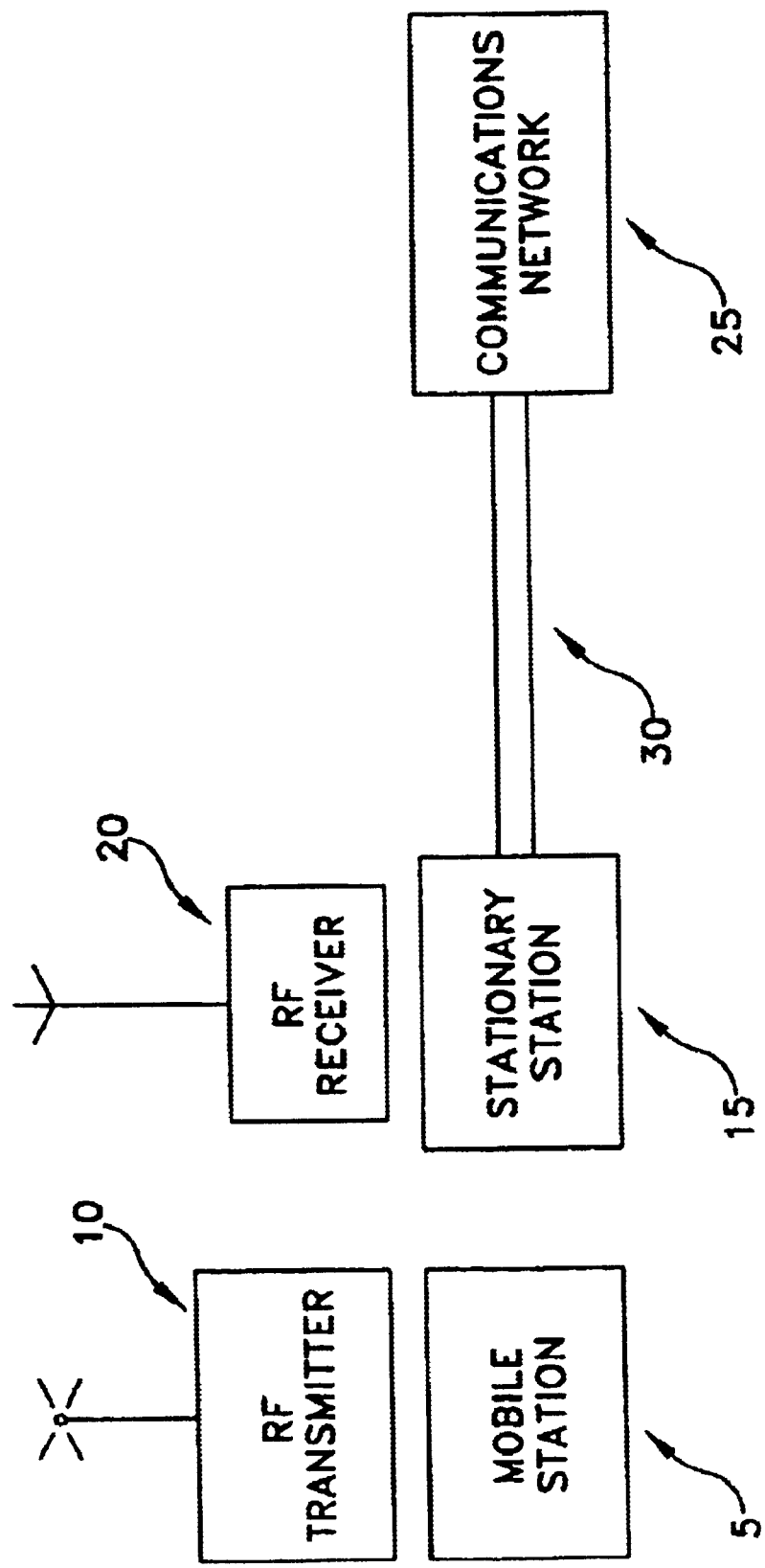
FIG. 1 is a schematic view of a communications system including a ground-based relay for connecting a stationary station to a communications network.
Figure 2:
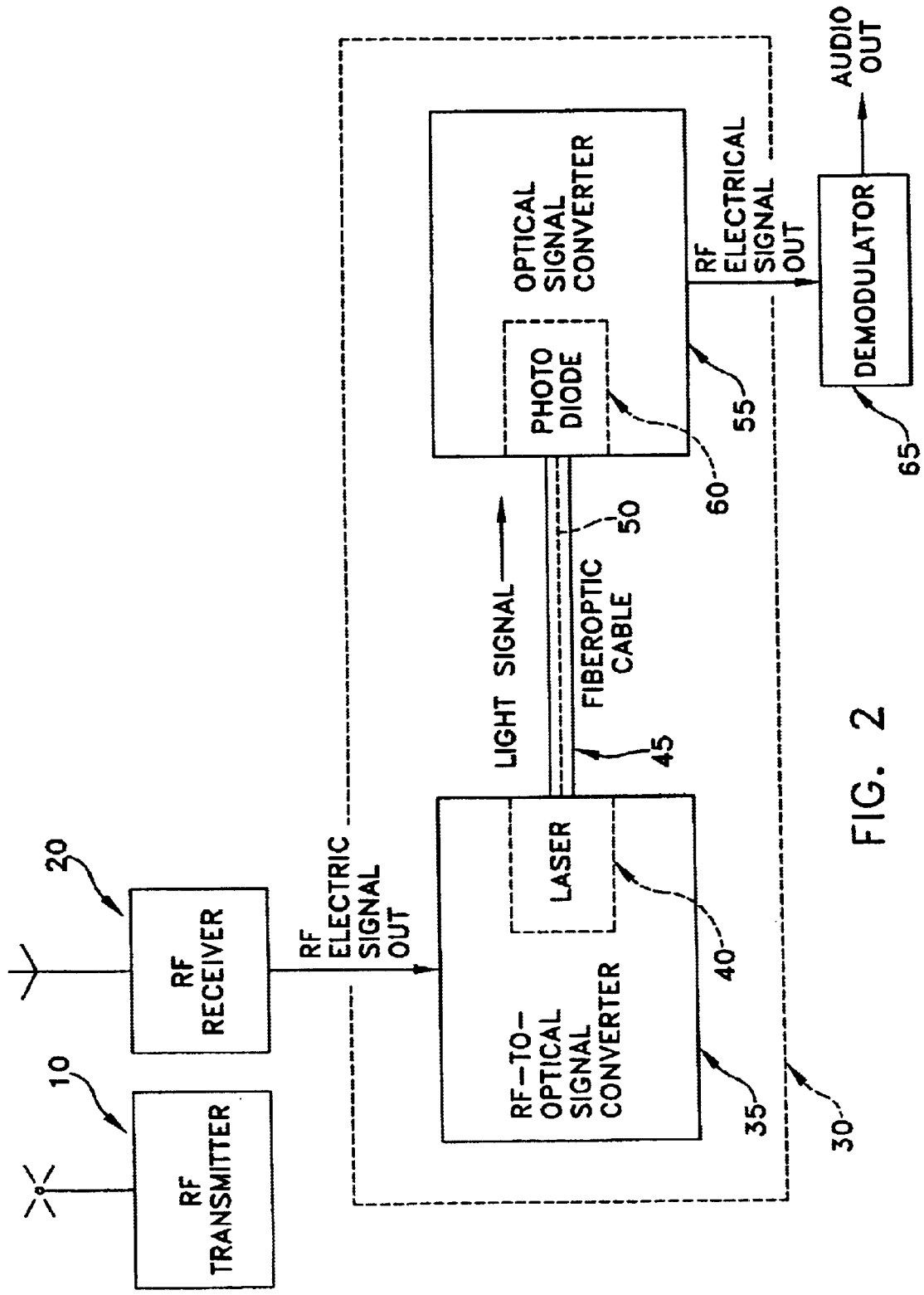
FIG. 2 is a schematic view of a fiberoptic relay, where a laser is located at one end (i.e., the receiver end) of the relay and a photodetector is located at the other end (i.e., the network end) of the relay.

Referring to FIG. 2, there is shown one possible construction for relay 30. More particularly, in this embodiment, relay 30 comprises an RF-to-optical signal converter 35 comprising a laser 40, a fiberoptic cable 45 comprising an optical fiber 50, an optical signal receiver 55 comprising a photodiode 60, and a demodulator 65. In this construction, RF receiver 20 receives the signal transmitted by RF transmitter 10 and generates a corresponding RF electrical signal. This signal is input to RF-to-optical signal converter 35, where it is used to correspondingly modulate laser 40. Laser 40 sends its modulated light signal into one end of fiberoptic cable 45. At the other end of the fiberoptic cable, optical signal receiver 55 receives the modulated light signal with its photodiode 60 and generates a corresponding RF electrical signal. This signal is then sent, either directly or after passing through a larger communications network, to demodulator 65 where it is converted back into the original message sent from RF transmitter 10.

Since optical fiber 50 may extend for a substantial distance, and since minimum attenuation of light in a silica fiber occurs in a wavelength of 1.5 $\mu$M, laser 40 is preferably designed to operate at this wavelength. For exemplary purposes it should be noted that InGaAsP semiconductor lasers can operate at this wavelength.

The system shown in FIG. 2 works well for many applications. However, the laser 40 incorporated in RF-to-optical signal converter 35 generally requires substantial power to operate, e.g., at least 500 mW of total power, and can, additionally, also require substantial cooling, which in turn requires additional power. In some situations, e.g., where RF-to-optical signal converter 35 is located at a remote site, this power may not be readily available.

Figure 3:
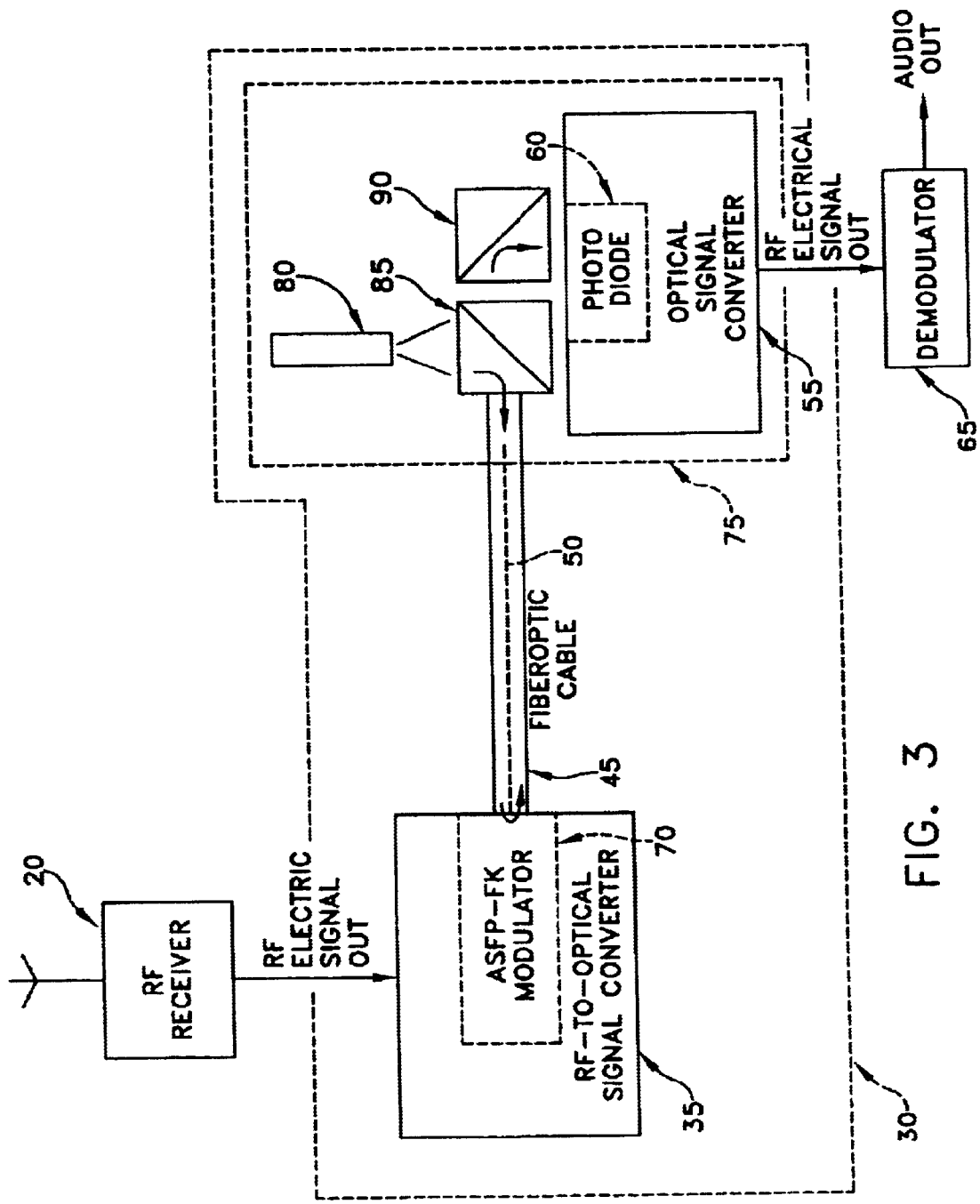
FIG. 3 is a schematic view of an alternative fiberoptic relay, where a laser is located at one end (i.e., the network end) of the relay and a modulator is located at the other end (i.e., the receiver end) of the relay.

To that end, there is shown in FIG. 3 a new low power fiberoptic relay 30. More particularly, in this embodiment, relay 30 comprises an RF-to-optical signal converter 35 comprising an ASFP-FK modulator 70, a fiberoptic cable 45 comprising an optical fiber 50, and a hub 75, where hub 75 comprises a laser 80, a pair of beam splitters 85 and 90, and an optical signal receiver 55 comprising a photodiode 60. Optical signal receiver 60 is connected to a demodulator 65, which may or may not be located within hub 75.

Figure 4:
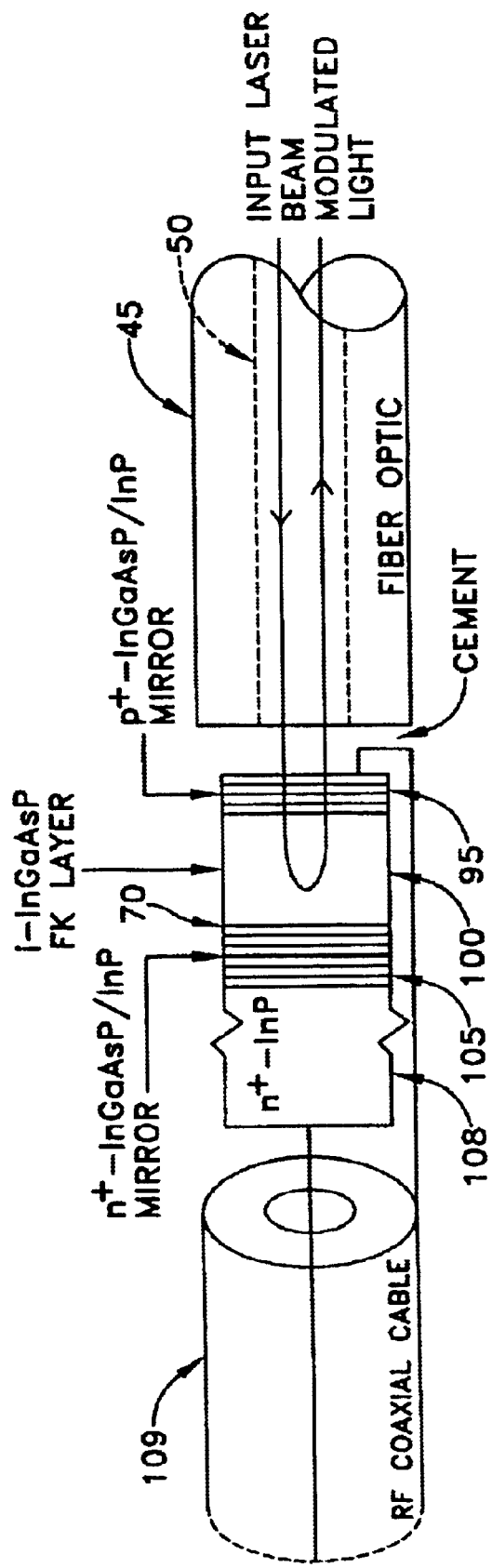
FIG. 4 is a schematic view of the modulator incorporated in the fiberoptic relay shown in FIG. 3.

ASFP-FK modulator 70 is shown in greater detail in FIG. 4. ASFP-FK modulator 70 comprises an Asymmetric Fabry-Perot Modulator using the Franz-Keldysh (FK) effect in a thin film of i-InGaAsP material designed for 1550 nm operation. More particularly, ASFP-FK modulator 70 comprises a top mirror 95 formed by a quarter-wave mirror stack comprising high reflectivity p+ type InP/InGaAsP layers, an intrinsic InGaAsP FK layer 100 for 1.5 μm operation, and a bottom mirror 105 formed by a quarter-wave mirror stack comprising low reflectivity (e.g., 30% to 50%) n+ type top, p+ type InP/InGaAsP layers. Bottom mirror 105 is attached to a base layer 108 formed out of n+ type InP material. ASFP-FK modulator 70 is connected to RF receiver 20 by connecting one electrode to top mirror 95 and one electrode to base layer 108, in the manner shown in FIG. 4. RF receiver 20 may be connected to ASFP-FK modulator 70 by means of an RF coaxial cable 109 (FIG. 4).

ASFP-FK modulator 70 may be grown monolithically, e.g., by a single Metal Organic Chemical Vapor Deposition (MOCVD) technique, which is advantageous since it typically requires no major post processing steps. In other words, after growth, the device needs only be metalized (e.g., electrodes connected), diced and mounted onto the polished end of optical fiber 50, as will hereinafter be described.

ASFP-FK modulator 70 designed to operate as follows. The respective reflectivity of top and bottom mirrors 95, 105 are designed such that they are balanced by the absorption through the Franz-Keldysh layer 100, resulting in zero reflectivity at wavelengths close to the band edge of the Franz-Keldysh layer. In the normally "off" mode, all the light is absorbed and no light is reflected back. However, the application of an electric field to the top and bottom electrodes of ASFP-FK modulator 70 (i.e., to top mirror 95 and base layer 108) causes large changes in the absorption coefficient and the Franz-Keldysh layer, off balancing the Fabry-Perot cavity and causing reflectivity to increase. By modulating the voltage applied to its electrodes, the reflectivity of ASFP-FK modulator 70 can be modulated very quickly, with high contrast (e.g., greater than 100:1) and high peak reflectivity (e.g., 30% to 50%).

ASFP-FK modulator 70 is coupled to one end of optical fiber 50 (e.g., by any method of optical fiber coupling such as the use of ultraviolet curable cement), which is a single mode fiber. By cementing the modulator directly onto the fiber, the modulator diameter need be only several times that of the fiber core. For a single mode fiber whose core is 10 μm, this requires a modulator diameter of no more than about 100 μm. In addition, the fiber end need only be polished before being cemented directly to ASFP-FK modulator 70, without the need for pigtailing.

Due to its construction, ASFP-FK modulator 70 requires minimal operational power, e.g., approximately 0.3 mW of power. Since, like all semiconductor devices, the ASFP-FK modulator 70 operates most effectively at a controlled temperature, e.g. 20 degrees C., a miniature thermoelectric heat sink (not shown) is preferably associated with the modulator. Such a thermoelectric heat sink typically requires about 10 mW of power. In addition, RF drivers (for receiving the RF signal and electronically modulating the modulator) draw about 25 mW of power. Thus, even with its associated thermoelectric cooler and associated RF drivers, ASFP-FK modulator 70 requires only about 25 mW of power, as opposed to the 500 mW of power typically required to drive laser 40 (FIG. 2) alone.

The rise time of the ASFP-FK modulator 70 is determined by an analog electric circuit which is in turn proportional to the modulator area. For the 100 μm modulator area discussed above, a rise time of about 10 psec is achievable. This results in modulation rates as high as 100 GHz.

Laser 80 is preferably a continuous wave (CW) laser operating at a wavelength of 1.5 μm so as to minimize attenuation of laser light in optical fiber 50.

The system operates as follows. RF receiver 20 receives the radio transmission and an associated amplifier (not shown) amplifies the signal to a 5 V level. This signal is used to directly modulate ASFK-FK modulator 70, which is coupled to single mode fiber 50. Laser 80 is directed (via beam splitter 85) into one end of fiber 50 and reflected from the modulator surface, modulated at the RF frequency. The modulated optical signal returns down fiber 50 and is directed (via beam splitter 90) to optical signal receiver 55, where it is converted (via photodiode 60) into a corresponding RF electrical signal. This signal is then sent to demodulator 65, where it is demodulated and converted to audio.

Since power is typically relatively abundant at the receiving end, i.e., at hub 75, placing laser 80 at this location (rather than at the receiver end of the relay) is a significant technical advantage. Furthermore, by using a high efficiency electrooptical modulator, optimized for the wavelength of the laser, power consumption at the receiver end of the system is reduced from about 500 mW to only about 25 mW.

In remote sites, power may be provided to RF receiver 20 and ASFK-FK modulator 70 by batteries and/or traditional solar cells. However, in some hostile environments, such a power source may not be practical.

Figure 5:
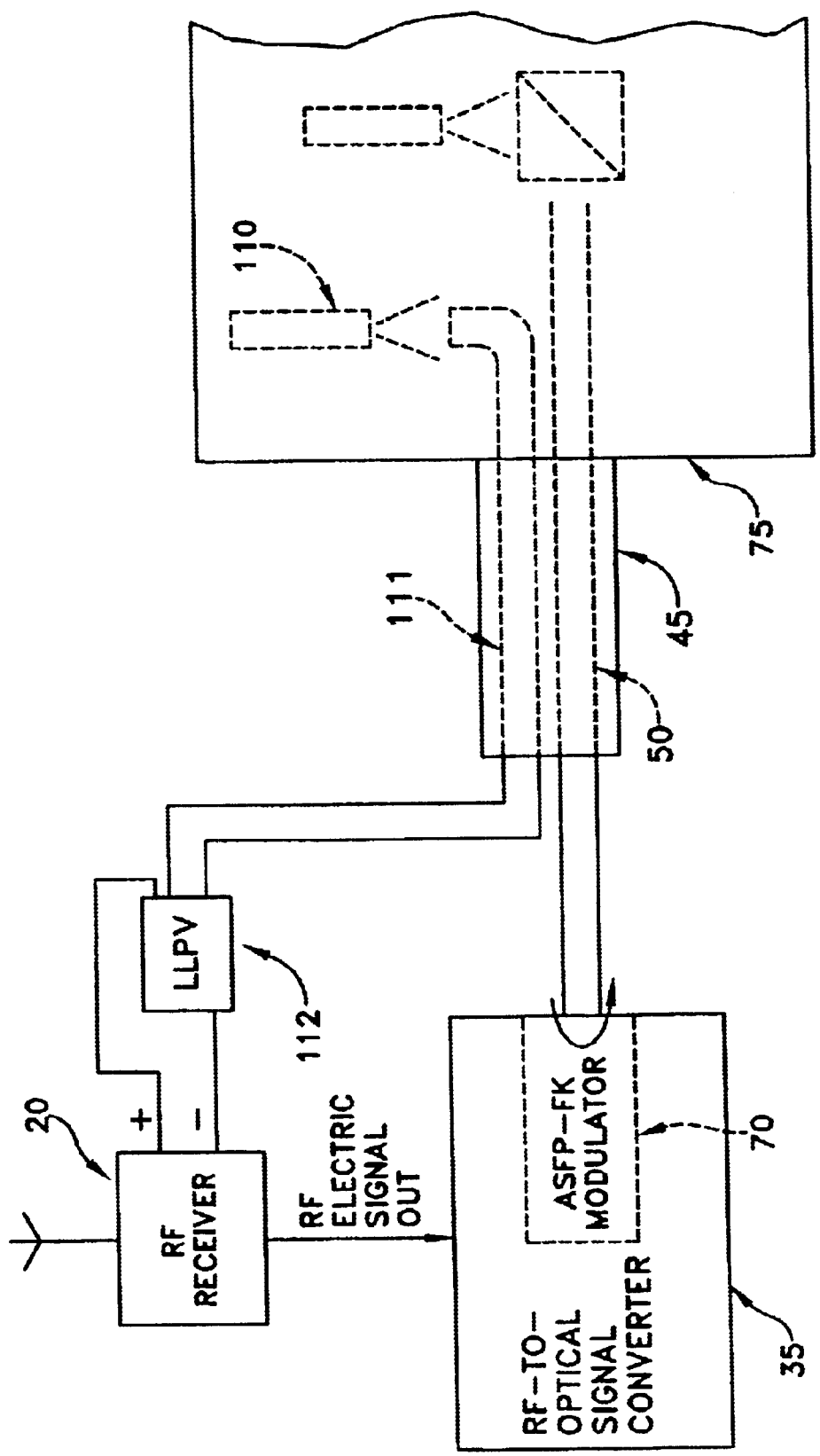
FIG. 5 is a schematic drawing like that of FIG. 3, except also including a second laser, a second fiberoptic line and a photovoltaic cell for delivering power to the RF receiver.

To this end, and looking now at FIG. 5, power may also be provided to RF receiver 20 and ASFK-FP modulator 70 by using a second laser 110, a second fiber 111 and a novel Laser Line PhotoVoltaic Cell (LLPV) 112. As noted above, minimum attenuation of light in a silica fiber occurs in the wavelength of 1.5 μm. Therefore, second laser 110 and LLPV 112 are designed to operate at this wavelength so as to minimize power loss within optical fiber 111. An InGaAsP semiconductor laser operates at this wavelength. LLPV 112 is a p-i-n InGaAsP detector that is monolithically grown in a normally-off Asymmetric Fabry-Perot structure. By taking advantage of the fact that the powering source is a single wavelength laser light, e.g., at 1.5 μm, the device is designed to absorb all of the incoming light, thereby resulting in greater than 90% conversion efficiency of the device. This is approximately 400% better than commercially available solar cells.

Figure 6:
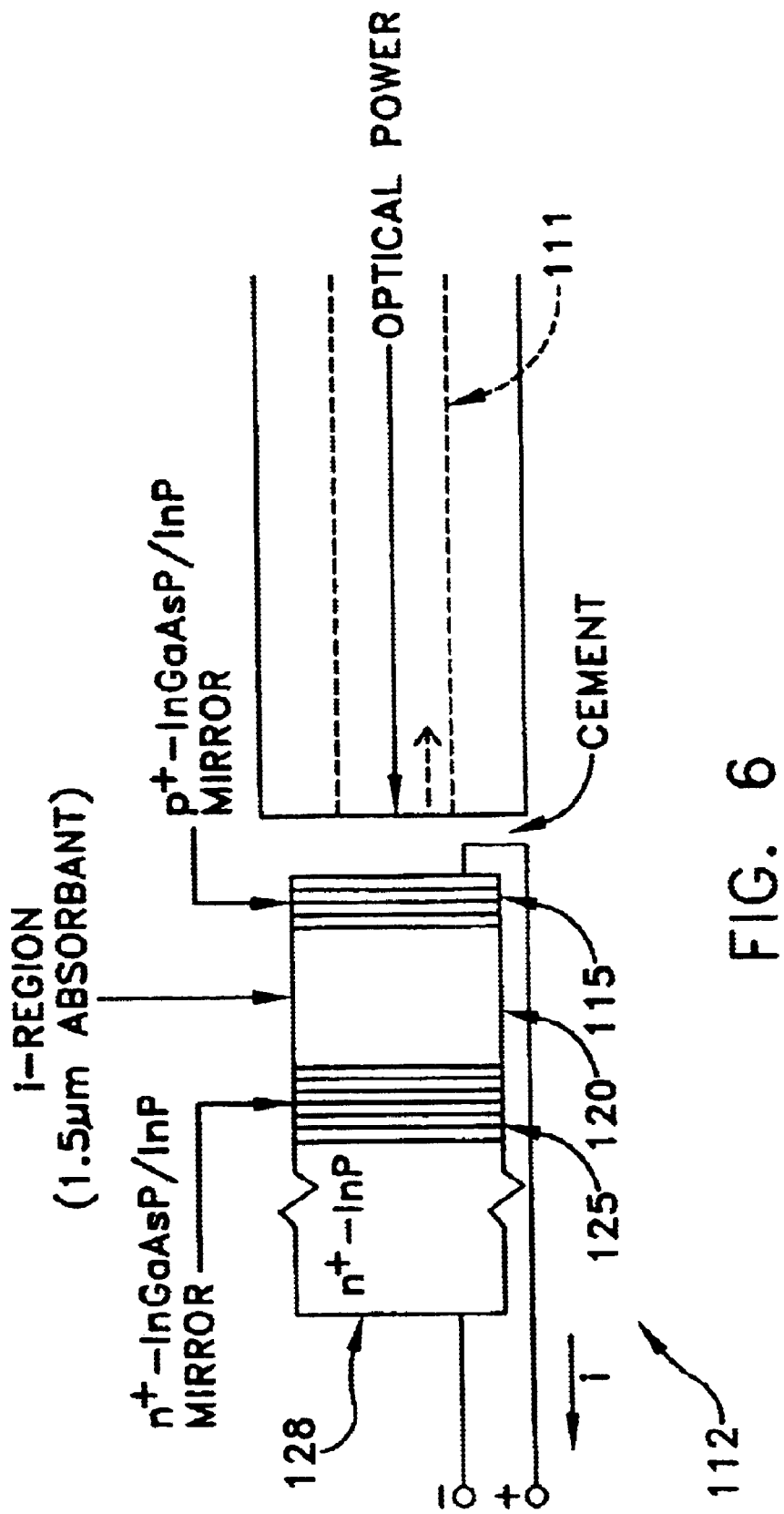
FIG. 6 is a schematic view of the photovoltaic cell incorporated in the system shown in FIG. 5.

LLPV 112 is shown in greater detail in FIG. 6. As can be seen in this figure, LLPV is nearly identical to the ASFP-FK modulator 70 discussed above. More particularly, LLPV 112 comprises a top mirror 115 formed by a quarter-wave mirror stack comprising high reflectivity p+type InP/InGaAsP layers, an intrinsic InGaAsP FK layer 120 for 1.5 μm operation, and a bottom mirror 125 formed by a quarter-wave mirror stack comprising low reflectivity (e.g., 30% to 50%) n+ type top, p+ type InP/InGaAsP layers. Bottom mirror 125 is attached to a base layer 128 formed out of n+ type InP material. However, unlike ASFP-FK modulator 70, with LLPV 112 the resistivity of the p+ and n+ layers, and all contacts, are relatively high in order to optimize the efficiency of the device. LLPV 112 is connected to RF receiver 20 by connecting one electrode to top mirror 115 and one electrode to base layer 128, in the manner shown in FIG. 6. The mirror reflectivities are designed such that the device will normally reflect no light under normal conditions (i.e., the normally "off" mode). This means that almost every electron produces an electron-hole pair which is then swept out of the depletion region, creating a photovoltaic current at approximately 0.8 V. The fact that all the light is absorbed means that near 100% efficiency can be expected.

Second optical fiber 111 is used to convey the light from laser 110 to LLPV 112, whereby to power LLPV 112. If desired, this second fiber 111 may be formed as a separate cable. However, multiple fibers can be accommodated in a single fiberoptic cable without crosstalk or compromising conductivity; therefore, if desired, fibers 50 and 111 may be accommodated in the same fiberoptic cable 45.

It is to be understood that the present invention is by no means limited to the particular constructions and method steps disclosed above and/or shown in the drawings, but also comprises any modifications or equivalents within the scope of the claims.

What is claimed is:

1. A light modulator comprising:

a first mirror comprising a quarter-wave mirror stack comprising high reflectivity p+ type InP/InGaAsP layers;

a Franz-Keldysh layer adjacent said first mirror said Franz-Keldysh layer comprising a thin film of i-InGaAsP material for operation at a given wavelength of a band edge of said Franz-Keldysh layer;

a second mirror adjacent said Franz-Keldysh layer, said second mirror comprising a quarter-wave mirror stack comprising low reflectivity n+ top, p+ type InP/InGaAsP layers;

a base layer adjacent said second mirror, said base layer comprising n+ type InP material; and a top electrode and a bottom electrode for applying an electric field across said Franz-Keldysh layer, said top electrode being connected to said first mirror and said bottom electrode being connected to said second mirror;

wherein application of an electric field across said top electrode and said bottom electrode causes absorption within said Franz-Keldysh layer to change so as to increase reflectivity of said light modulator.

* * * * *